Aug. 11, 1964    R. W. LUNDQUIST    3,143,798
SHRUBBERY TRIMMER
Filed May 4, 1962
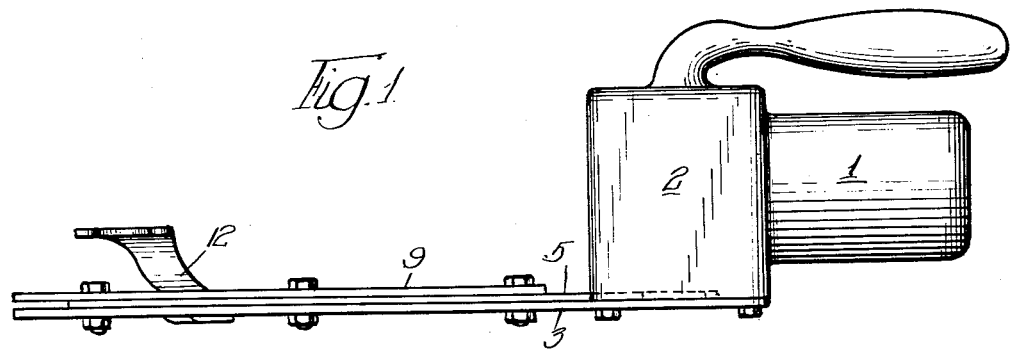
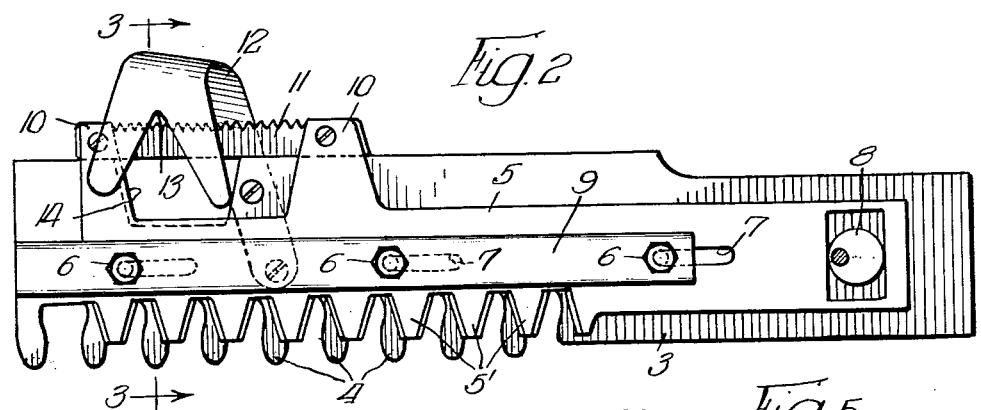
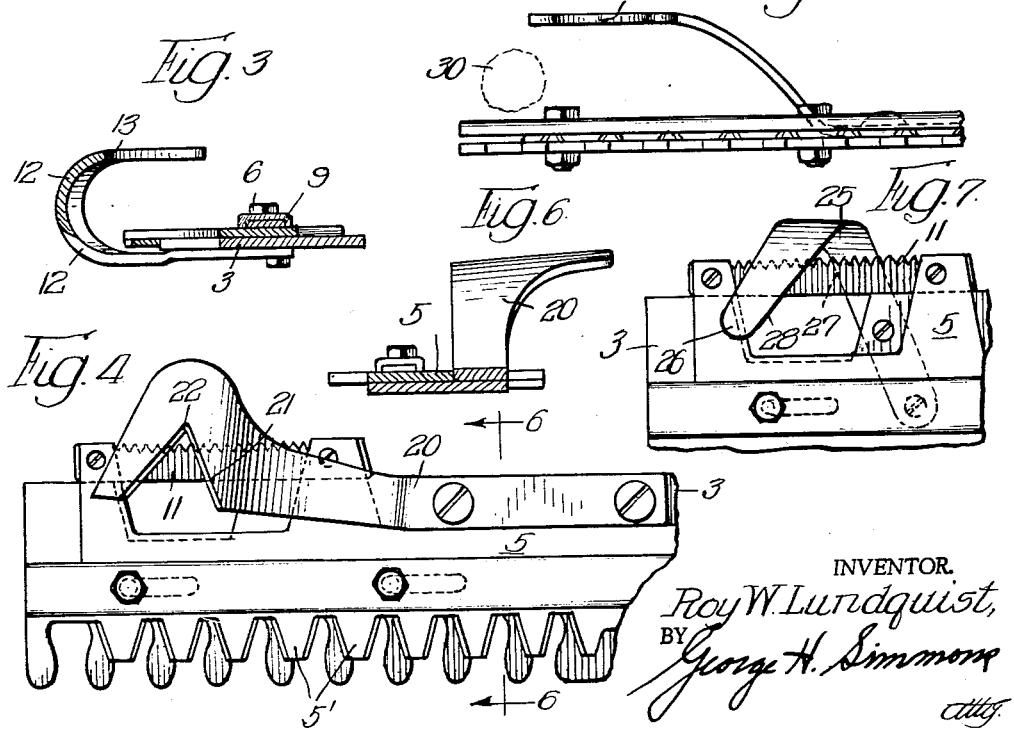
INVENTOR.
Roy W. Lundquist,
BY George H. Simmons
ATTY.

United States Patent Office 3,143,798
Patented Aug. 11, 1964

3,143,798
SHRUBBERY TRIMMER
Roy W. Lundquist, R.R. 1, Davenport, Iowa
Filed May 4, 1962, Ser. No. 192,524
6 Claims. (Cl. 30—166)

This invention relates to a power driven shrubbery trimmer and has for its principal object the provision of a new and improved device of this kind.

It is a main object of the invention to provide a power driven shrubbery trimmer which, in addition to the usual sickle bar type of cutter, is equipped with a saw for cutting branches that are too large to be cut by the sickle bar.

Another object of the invention is to provide a guard adjacent the saw blade, which guard is arranged to securely hold a branch while it is being severed by an operation of the saw blade.

Another object of the invention is to provide a shrubbery trimmer having a saw blade that is attached to the moving blade of the trimmer in such a manner as to be removable therefrom without the necessity of disassembling the remainder of the trimmer.

Another object of the invention is to provide a shubbery trimmer that is light in weight and can be manufactured and maintained at low cost without sacrificing quality.

Further objects, not specifically mentioned here, will be apparent from the detailed description and claims which follow, reference being had to the accompanying drawings in which a preferred embodiment of the invention is shown by way of example and in which:

FIG. 1 is a side elevational view of a shrubbery trimmer involving the invention;

FIG. 2 is a plan view of the blade assembly of the trimmer shown in FIG. 1;

FIG. 3 is a cross sectional view taken along the line 3—3 of FIG. 2, looking in the direction of the arrows;

FIG. 4 is a fragmentary view similar to FIG. 2 and showing a different embodiment of the invention;

FIG. 5 is a fragmentary elevational view of the embodiment shown in FIG. 4;

FIG. 6 is a cross sectional view taken along the line 6—6 of FIG. 4, looking in the direction of the arrows; and FIG. 7 is a fragmentary plan view showing still another embodiment of the invention.

Power driven hedge trimmers usually employ a sickle bar type of cutter having a stationary toothed plate upon which a reciprocating toothed plate is mounted, this latter plate being driven by a source of power, usually an electric motor. While devices of this kind are eminently successful in trimming hedges and the like, their use is limited in that branches approximately one-fourth of an inch in diameter are the largest that can be successfully severed by the trimmer.

In trimming shrubbery, such as lilac bushes, spirea bushes and the like, it frequently happens that branches larger than one-fourth of an inch in diameter must be cut to trim the bush to a desired contour. The present invention provides as a unitary structure a device capable of trimming branches up to approximately one inch in diameter.

In accomplishing this purpose, I attach to the movable blade of an ordinary hedge trimmer a saw blade that projects beyond the edge of the stationary plate of the trimmer opposite the teeth thereon. Attached to this plate is a guard which projects upwardly and over the saw blade and trimmer blade, terminating in a distal end portion that is substantially parallel to these blades. The guard is shaped so as to provide for holding the larger branches while they are being cut by the saw. Through this arrangement trimming of shrubbery is facilitated since it is not necessary to lay down the ordinary trimmer and pick up a pruning shear or saw when a larger branch is to be cut.

The invention will be best understood by reference to the accompanying drawings in which it will be seen that the device of the present invention consists of a motor 1 and gear box 2, the particular designs of which are not of the essence of the present invention since any one of the types of power units now available on the open market may be used. Fixed to the gear box 2 is a base plate 3 that projects laterally therefrom and is equipped on one of its edges with the usual sickle bar teeth 4. Mounted upon the plate 3 is a blade 5 secured thereon by bolts 6 which project through slots 7 in the blade to permit it to be reciprocated by a suitable drive means, indicated generally at 8 and shown as a Scotch yoke device. A retainer 9 is secured over the blade by the bolts 6 in the usual manner.

As will be seen best in FIG. 2, the blade 5 is equipped with ears 10 which are spaced apart and project laterally beyond the edge of the plate 3 opposite the teeth 5'. A saw blade 11 is secured to the distal ends of the ears 10 by suitable means such as bolts. Fixed to the underside of the plate 3 and extending outwardly and upwardly therefrom is a guard 12 which, in the embodiment shown in FIGS. 1 to 3, is bifurcated at its distal end, forming a V notch 13 the apex of which is located on the center of the stroke of the blade 5. It will be noted that the blade 3 is cut away, as indicated at 14, adjacent the saw blade 11. As will be seen in FIG. 3, the distal end of the guard 12 is positioned an appreciable distance above the blades, this distance governing the maximum size of branch that can be cut by the device.

In the embodiment of the invention shown in FIGS. 4 to 6, inclusive, the guard 20 is mounted on the upper side of the plate 3 and bears against the edge of the blade 5 opposite the teeth 5' thereon. The guard 20 extends upwardly and terminates in a bifurcated distal end equipped with a notch 21 the apex 22 of which is disposed on the center of the stroke of the blade 5.

In the embodiment of the invention shown in FIG. 7, the guard 25 is fixed to the underside of the plate 3 as before and extends upwardly, terminating in a distal end 26 that is spaced substantially above the blades 5 and 11. It will be noted that in this embodiment the guard 25 is of uniform width throughout its length; however, that portion 27 of the edge of the guard disposed beneath the saw blade 11 and the edge 28 disposed at the distal end of the guard together form in effect a V notch the apex of which is located on the center of the stroke of the blade 5 as before.

In operation of the device of the present invention when a branch too large to be cut by the sickle bar cutter of the device is encountered, the trimmer is turned edgewise, preferably with the saw downwardly, and then threaded over the branch such as 30, indicated in FIG. 5. The branch is thus registered with the V notch in the guard and the trimmer then rotated to feed the saw through the branch. Engagement of the branch with the notch or with the edges 27 and 28 of the embodiment shown in FIG. 7 holds the branch securely, preventing it from oscillating under the action of the saw. When the branch is completely cut through, the trimmer is returned to normal operating position and trimming continued until another branch too large to be cut by the sickle bar cutter is encountered.

From the foregoing, it will be apparent that the device of the present invention expands the field of utility of power driven trimmers. The addition of the ears, saw blade and guards to the trimmer adds but very little weight thereto, and as a result the device can be handled and manipulated as easily as prior art trimmers of which I am aware.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described the preferred embodiment of my invention, what I consider new and desire to have protected by Letters Patent is pointed out in the appended claims.

What I claim is:

1. A device of the class described, comprising: an elongated base plate; an elongated blade mounted upon said plate for longitudinal reciprocation with respect thereto; spaced apart ears projecting laterally adjacent one end of said blade and extending beyond one longitudinal edge of said plate; a saw blade fixed to said ears and extending therebetween; a guard fixed to said plate and extending upwardly therefrom and terminating in a distal end spaced from said plate and blade and disposed substantially parallel thereto and above said blades; and power means for reciprocating said blades.

2. A device as specified in claim 1, in which the guard is attached to the plate on the face thereof opposite the face upon which the blade is mounted.

3. A device as specified in claim 1, in which the guard is bifurcated at its distal end and contains a V slot the apex of which is aligned vertically with the center of the stroke of said saw blade.

4. A device as specified in claim 3, in which the guard is attached to the face of the plate on which the blade is mounted, with one edge of the guard engaging one edge of the blade.

5. A device as specified in claim 1, in which the guard is of uniform width from end to end and is disposed with its upper end at an angle to the edge of the saw blade, one edge of the distal end of the guard and the other edge of the guard section below the saw blade together forming in effect a V slot the apex of which is aligned vertically with the center of the stroke of the saw blade.

6. A device as specified in claim 1, in which the power means includes an electric motor.

References Cited in the file of this patent

UNITED STATES PATENTS

| | | |
|---|---|---|
| 1,224,194 | Miller | May 1, 1917 |
| 2,563,264 | Norgard | Aug. 7, 1951 |